March 22, 1932. R. R. HAGE 1,850,204
RESILIENT WHEEL
Filed July 26, 1929

Inventor
Robert R. Hage
By his Attorneys
Merchant Kilgore

Patented Mar. 22, 1932

1,850,204

UNITED STATES PATENT OFFICE

ROBERT R. HAGE, OF MINNEAPOLIS, MINNESOTA, ASSIGNOR OF ONE-HALF TO I. O. SLETTE, OF POPLAR, MONTANA

RESILIENT WHEEL

Application filed July 26, 1929. Serial No. 381,299.

My present invention provides an extremely simple and highly efficient resilient wheel adapted for general use on vehicles but especially adapted for automobile service and, generally stated, the invention consists of the novel devices and combinations of devices and arrangement of parts hereinafter described and defined in the claims.

A resilient wheel of this character is intended to make unnecessary the use of pneumatic tires, and hence will be found especially desirable for use in heavy automobile services such as trucks.

In the accompanying drawings, which illustrate the invention, like characters indicate like parts throughout the several views.

Referring to the drawings.

Figure 1:
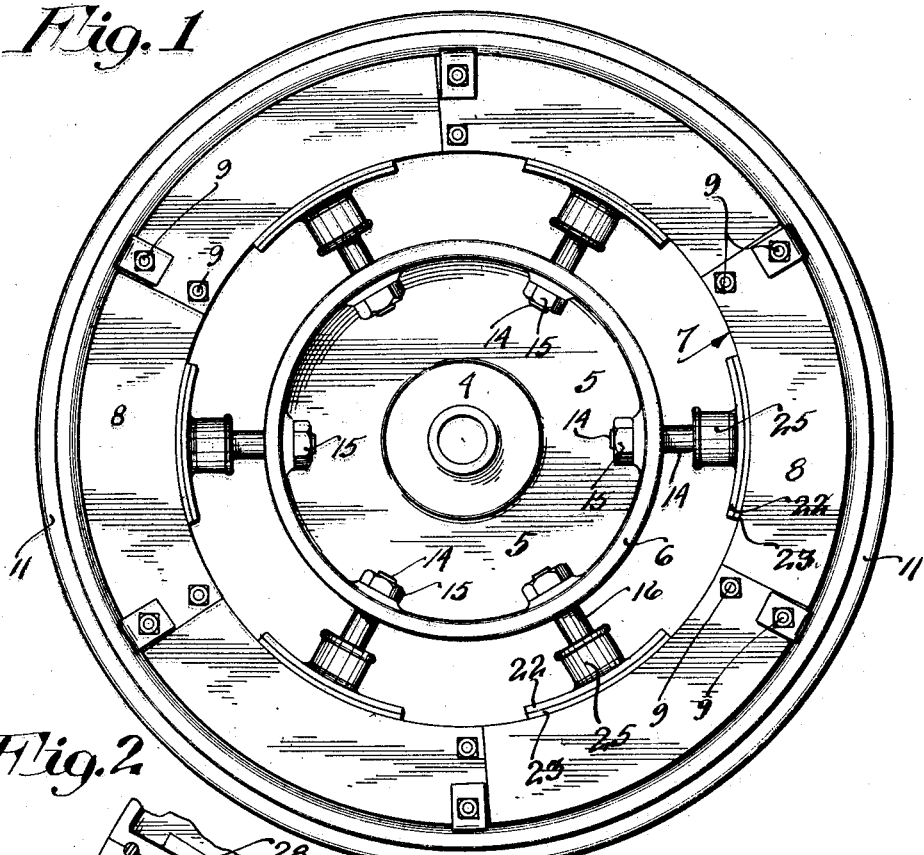
Fig. 1 is a view in side elevation showing the improved resilient wheel.
Figure 2:
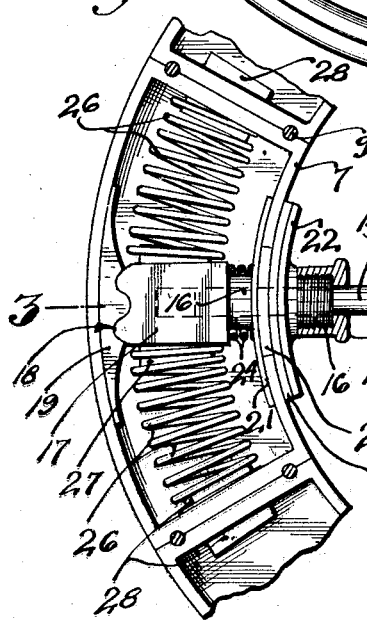
Fig. 2 is a fragmentary view partly in side elevation and partly in vertical section and with some parts removed showing the internal construction of the resilient wheel rim on a larger scale than in Fig. 1.
Figure 3:
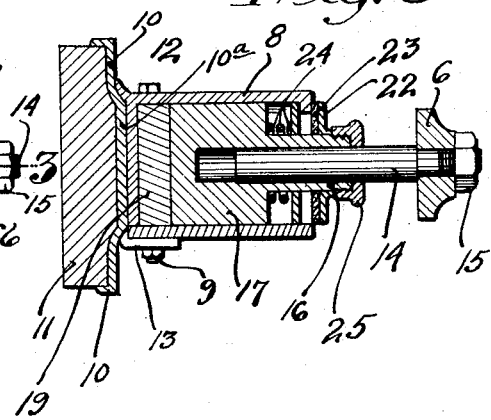
Fig. 3 is a section taken on the line 3—3 of Fig. 2.

The resilient wheel comprises, as its main elements, a hub and rim structure and resilient connections between the two. The hub structure is preferably of metal casting comprising a hub proper 4 and a disc-like web portion 5 having a cylindrical marginal flange 6.

The felly structure is made up of a plurality of segmental box-like sections 7 placed end to end so as to form a complete annular felly. At their normally open sides, the segmental sections 7 are provided with removable segmental side plates 8 that are set together with overlapping ends. The overlapping ends being rigidly clamped to the section 7 by nut-equipped bolts 9 extended through bolt passages, formed in each of the abutting ends of the section 7.

Seated upon and closely surrounding the segmental sections 7 is an endless annular wheel rim 10 preferably of roll steel formed with outstanding flanges that hold in position the solid tire 11, preferably of hard rubber. This rim 10 has a contracted central portion 10a that adapts it to be detachably but securely held in position by a retaining flange 12 and by clamping lugs 13. The flanges 12 are shown as formed integrally with the several felly sections 7 and the lugs 13 are detachably held to the felly structure by the outer nut-equipped bolts 9.

The resilient connections between the hub and felly structure comprise short circumferentially spaced, radially extended plunger acting spokes 14, the reduced ends of which are passed through radial seats in the hub flange 6 and are rigidly secured thereto by nuts 15. These spokes 14 are telescoped into the stems 16 of the spoke heads 17 that are located one in each of the felly sections 7 and have a sort of gear-tooth engagement at 18 each with a co-operating segmental shoe 19. The several shoes 19 have segmental outer surfaces that frictionally engage the concave inner surfaces of the outer flanges of the respective felly sections 7 and are free to slide circumferentially thereon under considerable friction. The stems 16 of the heads 17 work through circumferentially extended slots or clearance passages 20 formed in the inner flanges or walls of the section 7. These slots or passages 20 are kept closed by segmental inner metal plates 21 and segmental outer metal plates 22, which latter are preferably faced with a pliable material such as felt 23. Short coil springs 24, placed around the stems 16, are compressed between the adjacent plates 21 and the heads 17 and exert outward force on the latter. Preferably the inner ends of the stems 16 are threaded and provided with packing glands 25 that keep oil tight joints between the spokes 14 and the stems 16.

Strong coil springs 26 are placed in pairs in the felly sections 7 and are compressed between the heads 17 and the ends of the sections 7, said heads and the ends of the sections 7 are shown as provided with bosses 27 and 28, respectively, that hold the springs 26 in position. These springs 26 act in pairs, that is, two opposing springs act on the co-operating head 17 in opposite directions circumferentially of the felly and tend to hold the respective heads 17 and shoes 19 in centered or intermediate positions and in which positions the said parts will remain, when the hub structure is concentric to the felly and rim structure.

The resilience of the wheels is due to the following actions:

When a load is placed on the hub structure, it will move downward in respect to the felly and rim structure and will be resisted by springs 26 and the friction between the shoes 19 and the outer flanges of the felly sections 7. The chief function of the springs 24 is to keep the shoes 19 frictionally engaged with the section 7. It is evident that downward movement of the hub structure or any movement of the hub structure out of concentricity with the felly structure will be accomplished only by causing sliding movements of the several shoes 19 against the felly sections. These shoes, therefore, act in conjunction with the springs to give resilience to the wheel and said shoes further act more or less as shock absorbers. The structure above described is such that grease may be kept well lubricated so that the wear will be reduced to a minimum and noise will be eliminated.

What I claim is:

1. A resilient wheel rim comprising normally concentric hub and felly structures, the latter being made up of hollow segmental sections, shoes movable circumferentially under friction within said felly sections, heads connected to said shoes for sliding movements therewith, and having radially extended stems, spokes secured to said hub structure and telescopically engaging the stems of said heads, opposing springs re-acting against the ends of said felly sections and against said respective heads and springs re-acting against said heads and felly sections with a force pressing said shoes into frictional engagement with the respective felly sections.

2. A felly structure for a wheel of the kind described comprising a plurality of hollow segmental sections, detachable side plates for said sections, and nut-equipped bolts extended between the abutting ends of said felly sections and holding the side plates in position.

In testimony whereof I affix my signature.

ROBERT R. HAGE.